United States Patent
Park

(10) Patent No.: US 7,715,797 B2
(45) Date of Patent: May 11, 2010

(54) MOBILE COMMUNICATION TERMINAL EQUIPPED WITH SPEAKER PHONE FUNCTION AND METHOD FOR REMOVING FEEDBACK EFFECT WHEN SPEAKER PHONE IS USED

(75) Inventor: Seung Jong Park, Daejeon (KR)

(73) Assignee: LG Electronics Inc., Seoul (KR)

( * ) Notice: Subject to any disclaimer, the term of this patent is extended or adjusted under 35 U.S.C. 154(b) by 863 days.

(21) Appl. No.: 11/318,726

(22) Filed: Dec. 27, 2005

(65) Prior Publication Data

US 2006/0142070 A1 Jun. 29, 2006

(30) Foreign Application Priority Data

Dec. 29, 2004 (KR) .................. 10-2004-0114982

(51) Int. Cl.
*H04B 1/00* (2006.01)
*H04B 15/00* (2006.01)

(52) U.S. Cl. .................. 455/63.1; 455/501; 455/570; 455/114.2; 455/126; 381/94.3; 381/94.7; 379/406.1; 379/443.03

(58) Field of Classification Search .................. 455/517, 455/519, 90.3, 569.1, 569.2, 570, 63.1, 501, 455/114.2, 126, 278.1, 296; 381/94.3, 94.7; 379/406.1, 433.03
See application file for complete search history.

(56) References Cited

U.S. PATENT DOCUMENTS 4,790,002 A * 12/1988 D'Agosto et al. ............. 379/70
5,794,163 A    8/1998 Paterson et al.
6,731,912 B1   5/2004 Miyashita
7,003,099 B1 * 2/2006 Zhang et al. ............ 379/406.03
2002/0193130 A1* 12/2002 Yang et al. .................. 455/501
2003/0044025 A1  3/2003 Ouyang et al.
2004/0204207 A1 10/2004 Parker

FOREIGN PATENT DOCUMENTS

| CN | 1496092 | 9/2006 |
|---|---|---|
| GB | 2 261 576 | 5/1993 |
| GB | 2 399 928 | 9/2004 |
| JP | H01175347 | 7/1989 |
| JP | H04185145 | 7/1992 |
| JP | 2000083090 | 3/2000 |
| JP | 2000184036 | 6/2000 |
| JP | 200116560 | 1/2001 |
| JP | 200210344 | 1/2002 |
| JP | 2002010320 | 1/2002 |
| JP | 2004015699 | 1/2004 |
| WO | 97/25790 | 7/1997 |

* cited by examiner

*Primary Examiner*—Tuan A Pham
(74) *Attorney, Agent, or Firm*—Workman Nydegger

(57) ABSTRACT

A mobile communication terminal equipped with speaker phone functionality and a method for removing feedback when the speaker phone is in use are disclosed. The mobile communication terminal includes: a first voice input path serving as a default voice input path; a second voice input path serving as an additional voice input path; and a controller for determining whether a speaker phone is in use, wherein the controller selects one of the first and second voice input paths according to whether the speaker phone is in use.

13 Claims, 3 Drawing Sheets

MOBILE COMMUNICATION TERMINAL EQUIPPED WITH SPEAKER PHONE FUNCTION AND METHOD FOR REMOVING FEEDBACK EFFECT WHEN SPEAKER PHONE IS USED

CROSS REFERENCE TO RELATED APPLICATIONS

This application claims the benefit of Korean Patent Application No. 10-2004-0114982, filed on Dec. 29, 2004, which is hereby incorporated by reference as if fully set forth herein.

BACKGROUND OF THE INVENTION

1. Field of the Invention

The present invention relates to a mobile communication terminal equipped with speaker phone functionality, and more particularly to a method for removing noise caused by feedback during speaker phone operation, as well as a mobile communication terminal for implementing the method.

2. Discussion of the Related Art

With the increasing development of communication technologies, a wide variety of mobile communication terminals, including cellular telephones and other wireless communication apparatus, have been recently developed. Among these, mobile communication terminals having speaker phone functionality have proven effective and preferred for users in certain situations, including terminal use while operating a motor vehicle or performing other tasks where traditional use of the terminal may be difficult or unsafe.

Mobile communication terminals having conventional speaker phone technology typically employ a speaker and a single non-directional microphone. Therefore, when the speaker phone feature is used, there arises an unexpected feedback phenomenon that is generated when a received voice signal produced by the terminal's speaker is undesirably received and amplified via the speaker phone microphone. In addition, external noise is also picked up by the microphone such that the quality of the voice signal received by the terminal is unsatisfactory, or at the least, sub-optimal.

SUMMARY OF THE INVENTION

Accordingly, the present invention is directed to a mobile communication terminal capable of reducing feedback and other undesired noise when a speaker phone feature of the terminal is used. Additionally, a method for removing feedback and undesired noise during speaker phone use is disclosed such that one or more problems due to limitations and disadvantages of the related art are overcome.

In an example embodiment, a mobile communication terminal is disclosed that includes a speaker phone feature, as well as a first voice input path and a second voice input path. The first voice input path includes a non-directional microphone that is used by default during typical, non speaker phone terminal use. The second voice input path includes a unidirectional microphone optimized for use during speaker phone use.

A controller is also included in the terminal. The controller governs which voice input path is used during terminal use. When the speaker phone is in use, the controller employs the unidirectional microphone and associated second voice input path. In addition, the controller controls selective gain reduction of predetermined frequency bands that are apt to produce feedback during speaker phone use, thereby preventing or reducing the incidence of feedback while the terminal is in speaker phone mode. The controller can govern voice input path switching automatically or via a user-operated switch. Methods for implementing use of the above devices in the manner described are also disclosed.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principles of the invention. In the drawings.

DETAILED DESCRIPTION OF THE INVENTION

Reference will now be made in detail to various embodiments of the present invention, examples of which are illustrated in the accompanying drawings. Wherever possible, the same reference numbers will be used throughout the drawings to refer to the same or like parts.

Figure 1:
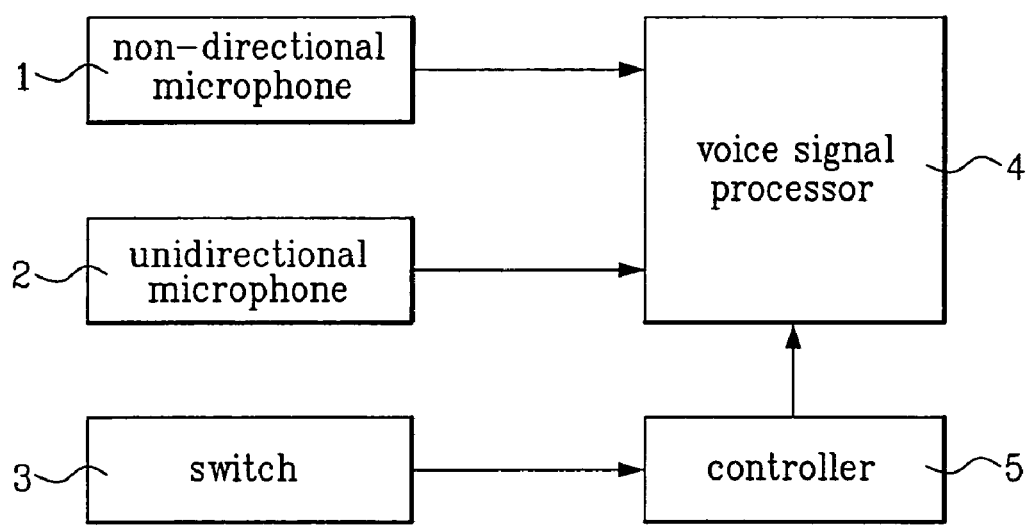
FIG. 1 is a block diagram illustrating a mobile communication terminal equipped with speaker phone functionality according to one embodiment of the present invention.

FIG. 1 is a block diagram illustrating a mobile communication terminal ("terminal") equipped with speaker phone functionality according to one embodiment of the present invention. In the embodiments to be described herein, the mobile communication terminal is implemented as a cellular phone. However it is appreciated that in other embodiments the terminal can include other voice communication devices, including 2-way radios, pagers, PDA-phones, etc. As such, the details of the embodiments to be described herein as applied to mobile communication terminals should not be construed as limiting the present invention in any way.

Referring to FIG. 1, the mobile communication terminal equipped with speaker phone functionality according to one embodiment of the present invention includes: a non-directional microphone 1 serving as a default voice input device for converting a voice signal of the terminal user into an electric signal; a unidirectional microphone 2 primarily employed for receiving a voice signal from a predetermined direction when the speaker phone feature of the terminal is used, and for converting a voice signal from a user/users of the terminal into an electric signal; a controller 5 for selectively designating the unidirectional microphone 2 as a voice input device when the speaker phone function is used; a voice signal processor 4 for processing a voice signal received via either the non-directional microphone 1 or the unidirectional microphone 2 upon receiving a control signal from the controller 5; and a switch 3 for transmitting the terminal user's intention to the controller 5 when the user desires to select which of the non-directional microphone 1 or the unidirectional microphone 2 to use. In one embodiment, the controller 5 is a Mobile Station Modem (MSM) included in the terminal.

The switch 3 may be installed on a predetermined portion of the mobile communication terminal to enable ease of use by the user. If the mobile communication terminal is configured as a Push-To-Talk (PTT) terminal capable of performing a group communication function, a PTT function button may function as the switch 3. In this case, a control signal is generated by the selection, via the switch 3, of a desired microphone. The control signal is then transmitted to the voice signal processor 4 after the control signal is automatically generated from the controller 5. In other embodiments, other control signals may be generated by the controller 5 via receipt by the controller of a speaker phone enable signal or a PTT enable signal. As such, it is appreciated that the voice signal processor 4 can be alerted to which microphone of the terminal is to be used during communication activities autonomously, via a switch, or by other acceptable means.

If the unidirectional microphone 2 is used during speaker phone operation by the terminal, the controller 5 is configured in one embodiment to transmit to the voice signal processor a control signal that is configured to implement an echo-canceling function. Therefore, the controller 5 can prevent the inclusion of peripheral noise in a voice signal that is detected and transmitted via the unidirectional microphone 2. In detail, a coder-decoder ("CODEC") (not shown) is employed to prevent cyclical amplification of a voice signal between the active microphone and a speaker phone speaker of the terminal. The CODEC in one embodiment is contained in the controller 5 and operates by reducing gains of frequency bands (i.e., frequency bands of 125 k, 1 k, 2 k, 5 k, and 8 k), which are traditionally apt for carrying feedback signals.

Figure 2:
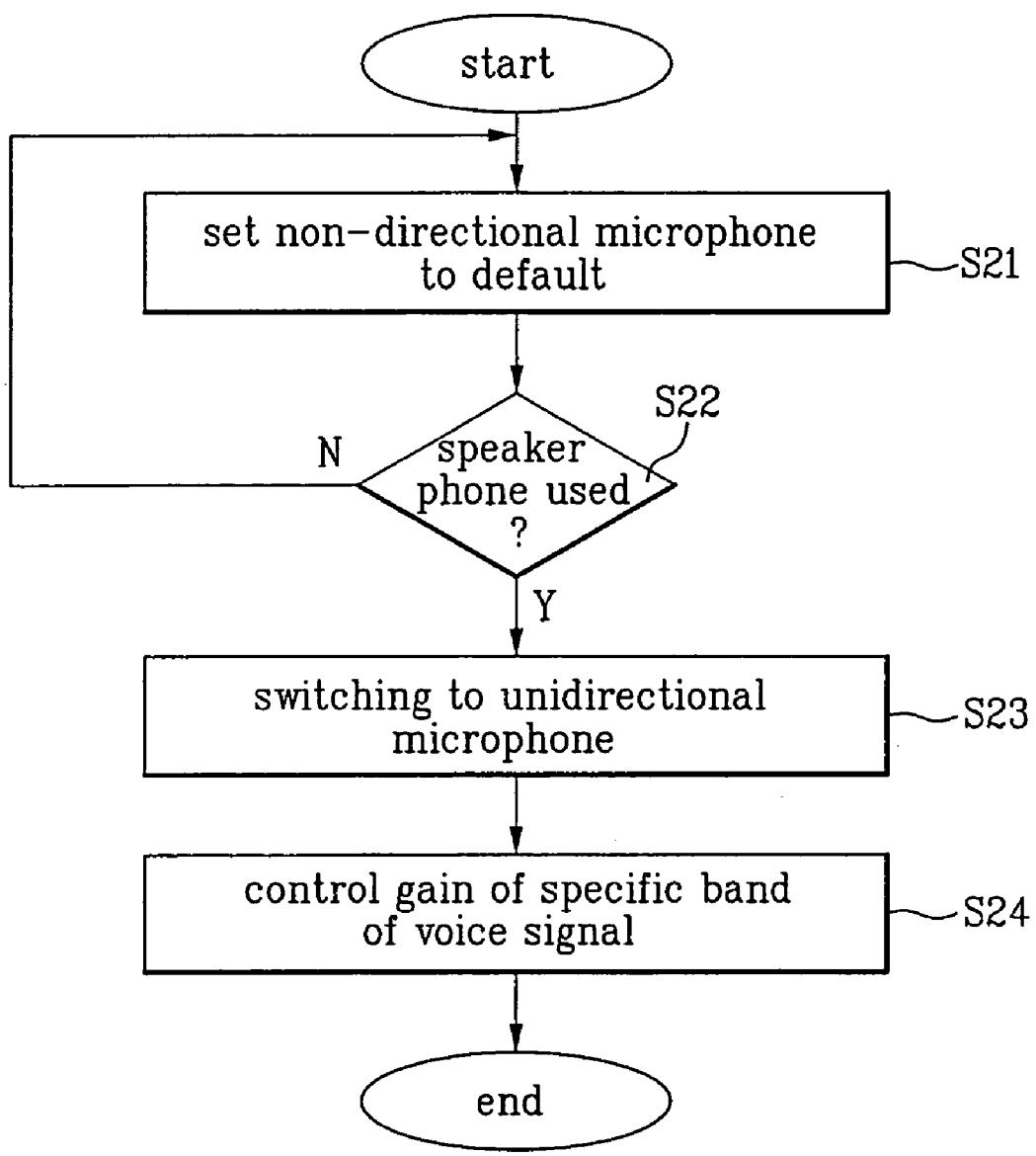
FIG. 2 is a flow chart illustrating a method for removing feedback effects when a speaker phone is used according to one embodiment of the present invention.

FIG. 2 is a flow chart illustrating a method for removing feedback effects when a speaker phone of the terminal is used according to embodiments of the present invention. Referring to FIG. 2, a non-directional microphone, such as the non-directional microphone 1 shown in FIG. 1, is set as the default voice input source for the terminal at stage S21. Thus, a voice signal input path is established from the non-directional microphone to the voice signal processor, such as the processor 4 shown in FIG. 1. In one embodiment, stage S21 includes providing a power supply signal to enable operation of the non-directional microphone.

If a user uses a speaker phone feature of the terminal or executes the speaker phone functionality of a PTT terminal at stage S22, the unidirectional microphone, such as the unidirectional microphone 2 of FIG. 1, is set as the active voice input source at stage S23, thereby establishing a voice signal input path from the unidirectional microphone to the processor 4. So established, the non-directional microphone is no longer active.

The switching from the non-directional microphone to the unidirectional microphone in stage S23 is executed in one embodiment via a control signal produced by the controller 5. In one embodiment, the switching from the non-directional microphone to the unidirectional microphone and correspondingly altering the voice signal input path as described above is automatically performed by the controller 5. In another embodiment, switching can be commenced via a specific switch, such as the switch 3 in FIG. 1, that is positioned on a predetermined portion of the terminal housing. As such, if the user presses a speaker phone switch to use the speaker phone, the controller 5 recognizes the pressed signal and automatically generates a necessary control signal according to the recognized signal. The above-mentioned operations can be equally applied to a PTT terminal for use in group communication at step S23.

Should the unidirectional microphone be employed as the active voice input source pursuant to speaker phone operation in connection with stages S22 and S23, feedback and/or noise are controlled at stage S24. This is achieved not only by use of the unidirectional microphone as opposed to the non-directional microphone, but also by selective gain control of selected frequency bands governed by control signals of the controller 5 of FIG. 1. As a result, call quality deterioration caused by noise and/or feedback is reduced or eliminated, thereby producing a relatively clearer voice signal.

Figure 3:
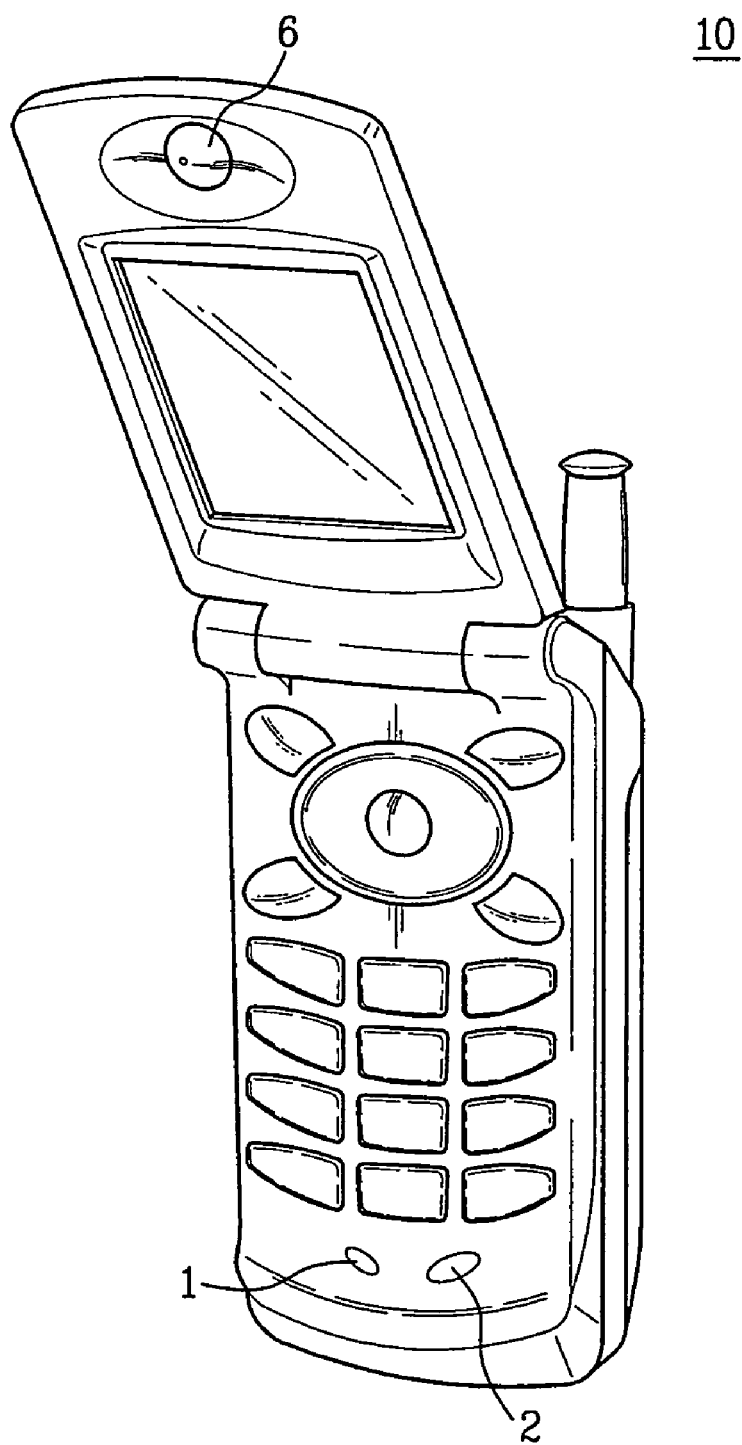
FIG. 3 is a perspective view illustrating a mobile communication terminal according to one embodiment of the present invention.

FIG. 3 is a perspective view illustrating a mobile communication terminal that is configured according to one embodiment of the present invention. The terminal shown in FIG. 3 is a folding "clamshell" style cellular phone, though terminals of different types and configurations can also be employed according to embodiments of the present invention. As can be seen from FIG. 3, the non-directional microphone 1 and the unidirectional microphone 2 are formed in parallel with each other. A speaker 6 is also shown. So configured, the mobile communication terminal shown in FIG. 3 can prevent deterioration of call quality by feedback of a voice signal related to terminal operation, as described.

As is apparent from the above description, a mobile communication terminal equipped with speaker phone functionality and a method for removing feedback from such a terminal according to embodiments of the present invention includes not only a non-directional microphone but also a unidirectional microphone serving as an auxiliary microphone for speaker phone operations. The terminal is further configured such that feedback effects can be removed, especially during use of the speaker phone feature. Therefore, it is expected that relatively superior call quality will be established during use of the terminal in speaker phone mode.

It will be apparent to those skilled in the art that various modifications and variations can be made in the present invention without departing from the spirit or scope of the invention. Thus, it is intended that the present invention covers modifications and variations of the present invention provided they come within the scope of the appended claims and their equivalents.

What is claimed is:

1. A mobile communication terminal comprising:
   a first voice input path serving as a default voice input path, the first voice input path including a non-directional microphone;
   a second voice input path serving as an additional voice input path, the second voice input path including a unidirectional microphone; and
   a controller for determining whether a speaker phone of the terminal is in use, the controller selects the second voice input path if determining the speaker phone is in use, controls the selected second voice input path to receive a voice signal from a predetermined direction via the unidirectional microphone during the use of the speaker phone, and prevents inclusion of peripheral noise in the voice signal received via the unidirectional microphone during the use of the speaker phone,
   wherein the controller reduces an amplification gain of a predetermined frequency band of the voice signal received via the unidirectional microphone for preventing the inclusion of the peripheral noise and removing a feedback signal, and the predetermined frequency band is a frequency band that otherwise contributes to the feedback signal during the use of the speaker phone.

2. The mobile communication terminal according to claim 1, wherein the voice input path selection between the first and second voice input paths is automatically selected by the controller according to whether the speaker phone is in use.

3. The mobile communication terminal according to claim 1, wherein the voice input path selection between the first and second voice input paths is controlled by a signal received by the controller via a predetermined input device capable of receiving a user request.

4. The mobile communication terminal according to claim 1, wherein the mobile communication terminal is a Push-To-Talk (PTT) terminal capable of performing a group communication function.

5. A mobile communication terminal comprising:
a non-directional microphone serving as a default voice input device for converting a voice signal into an electric signal during use of the terminal;
a unidirectional microphone for preventing the generation of feedback signal with respect to the voice signal; and
a controller for determining whether a speaker phone of the terminal is in use during use of the terminal, the controller selecting the unidirectional microphone as the voice input device when the speaker phone is in use and the controller selecting the non-directional microphone as a voice input device when the speaker phone is not in use;
wherein the controller reduces an amplification gain of a predetermined frequency band of the voice signal received via the unidirectional microphone when the speaker phone is in use to prevent the inclusion of the peripheral noise and to remove the feedback signal, and the predetermined frequency band is a frequency band that otherwise contributes to the feedback signal when the speaker phone is in use.

6. The mobile communication terminal according to claim 5, wherein modification of a voice input path to include one of the non-directional microphone and the unidirectional microphone is automatically performed according to whether the speaker phone is in use.

7. The mobile communication terminal according to claim 5, wherein modification of a voice input path to include one of the non-directional microphone and the unidirectional microphone is controlled by a signal received via a predetermined input device capable of receiving a user request.

8. The mobile communication terminal according to claim 5, wherein the mobile communication terminal is a Push-To-Talk (PTT) terminal capable of performing a group communication function.

9. A method for removing feedback during use of a mobile communication terminal having speaker phone functionality, comprising:
a) upon receiving a power-supply signal, selecting a first voice input path that includes a non-directional microphone as a default voice input device for the first voice input path;
b) determining whether a speaker phone is in use using a controller;
c) if the controller determines that the speaker phone is in use, selecting a second voice input path by switching from the non-directional microphone to a unidirectional microphone as the voice input device for the second voice input path; and
d) preventing the inclusion of peripheral noise in a voice signal received via the unidirectional during the use of the speaker phone to remove a feedback signal,
wherein the preventing comprises reducing an amplification gain of a predetermined frequency band of the voice signal received via the unidirectional microphone, and the predetermined frequency band is a frequency band that otherwise contributes to the feedback signal.

10. The method according to claim 9, wherein switching from the non-directional microphone is performed according to a predetermined input signal that reflects a switching request by a user.

11. The method according to claim 9, wherein switching from the non-directional microphone is automatically performed via the control signal of the controller that determines whether the speaker phone is in use.

12. The method according to claim 11, wherein the controller is a Mobile Station Modem (MSM) of the mobile communication terminal.

13. The method according to claim 9, wherein the mobile communication terminal is a Push-To-Talk (PTT) terminal capable of performing a group communication function.

* * * * *